M. W. GRIFFITHS.
TIRE UPSETTER.

No. 184,074.              Patented Nov. 7, 1876.

WITNESSES:
A. W. Almqvist
John Goethals

INVENTOR:
M. W. Griffiths
BY
Munn & Co.
ATTORNEYS.

UNITED STATES PATENT OFFICE.

MORRIS W. GRIFFITHS, OF MIDDLE GRANVILLE, NEW YORK.

IMPROVEMENT IN TIRE-UPSETTERS.

Specification forming part of Letters Patent No. 184,074, dated November 7, 1876; application filed September 2, 1876.

*To all whom it may concern:*

Figure 1:
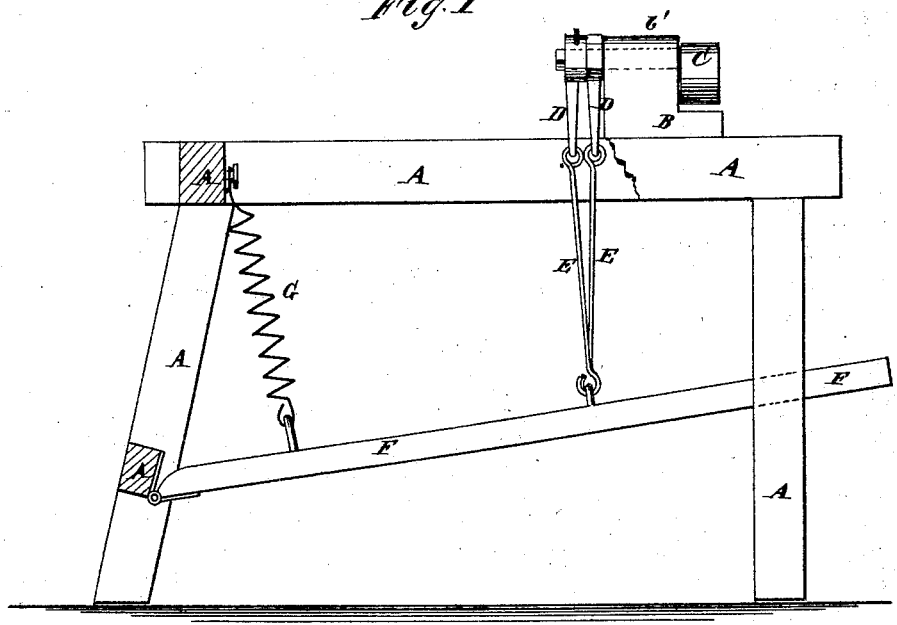
Figure 2:
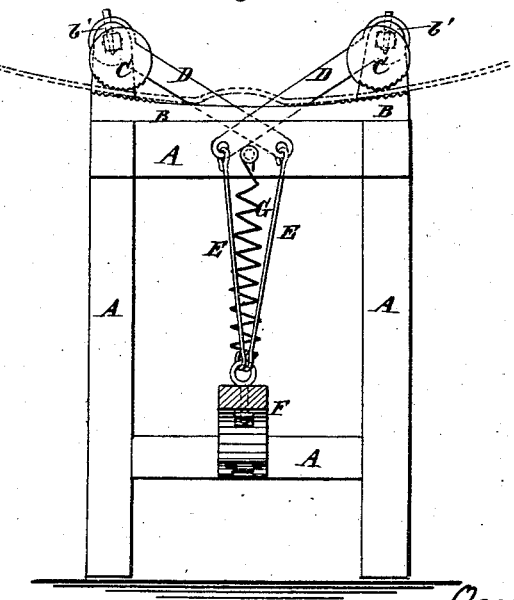

Be it known that I, MORRIS W. GRIFFITHS, of Middle Granville, county of Washington and State of New York, have invented a new and useful Improvement in a Tire-Upsetter, of which the following is a specification:

In the accompanying drawing, Figure 1 is a side view of my improved machine, part being broken away to show the construction. Fig. 2 is a front end view of the same.

Similar letters of reference indicate corresponding parts.

The object of this invention is to furnish a simple, convenient, and effective machine for upsetting or shortening tires without cutting and welding them.

The invention will first be described in connection with the drawing, and then pointed out in the claim.

In the drawing, A represents the frame of the machine, which is made of a convenient length, breadth, and height, and to the top of which toward its forward end is attached a plate or bar, B, of sufficient strength to be hammered upon. Upon the ends of the plate B are formed lugs $b'$, to which are pivoted eccentrics C, the faces of which should be faced with steel and roughened. To the rear ends of the pivots of the eccentrics C are attached inwardly-projecting levers D, to the inner ends of which are pivoted the upper ends of the rods E. The lower ends of the rods E are pivoted to a foot-lever or treadle, F, the rear end of which is hinged to the lower part of the rear end of the frame A. The treadle F is held up by a spiral spring, G, the lower end of which is attached to the upper part of the rear end of the frame A.

In using the machine the part of the tire to be upset is heated and is bent inward over the horn of an anvil, more or less, according as the tire is to be shortened more or less. The bent part of the tire is then placed upon the plate B, and is clamped by the eccentrics C, by operating the treadle F. The bend is then hammered out of the tire by hammering the tire down to the plate B, and the tire will be shortened.

Having thus described my invention, I claim as new and desire to secure by Letters Patent—

The combination of the bar or plate B, having lugs $b'$ formed upon its ends, the eccentrics C, the levers D, the connecting-rods E, the treadle F, and the spiral spring G, with each other and with the frame A, substantially as herein shown and described.

MORRIS W. GRIFFITHS.

Witnesses:
  GEO. E. PAUL, M. D.,
  HUGH R. EVENS.